United States Patent [19]

Coulon et al.

[11] Patent Number: 4,852,645
[45] Date of Patent: Aug. 1, 1989

[54] THERMAL TRANSFER LAYER

[75] Inventors: Michel Coulon, Le Plessis Bouchard; Robert Faron, Courbevoie; Daniel Besson, Lyon, all of France

[73] Assignees: Le Carbone Lorraine; Uranium Pechiney; Navatome, all of Courbevoie, France

[21] Appl. No.: 163,115

[22] PCT Filed: Jun. 15, 1987

[86] PCT No.: PCT/FR87/00220

§ 371 Date: Feb. 12, 1988

§ 102(e) Date: Feb. 12, 1988

[87] PCT Pub. No.: WO87/07695

PCT Pub. Date: Dec. 17, 1987

[30] Foreign Application Priority Data

Jun. 16, 1986 [FR] France ............................... 86 08981
Jan. 23, 1987 [FR] France ............................... 87 01213

[51] Int. Cl.$^4$ .............................................. F28F 21/00
[52] U.S. Cl. ................................. 165/180; 165/185; 165/905; 165/81; 138/140; 122/367 R; 428/408; 29/157.4
[58] Field of Search ................. 165/180, 905, 185, 81; 138/140, 141, 145, 146, 149; 427/122, 373; 106/38.28; 264/109; 428/408; 122/367 R; 29/157.4

[56] References Cited

U.S. PATENT DOCUMENTS

| | | | |
|---|---|---|---|
| 3,726,738 | 4/1973 | Gellon et al. | 156/276 |
| 3,832,273 | 8/1974 | O'Connor | 138/140 |
| 4,045,286 | 8/1977 | Blum et al. | 176/49 |
| 4,208,373 | 6/1980 | Matovich | 138/109 |
| 4,432,408 | 2/1984 | Caines | 165/905 |
| 4,471,837 | 9/1984 | Larson | 165/185 |
| 4,496,621 | 1/1985 | Hubert et al. | 165/180 |
| 4,572,864 | 2/1986 | Benson et al. | 428/404 |
| 4,762,172 | 8/1988 | Grehier et al. | 165/165 |

FOREIGN PATENT DOCUMENTS

| | | |
|---|---|---|
| 1395964 | 3/1965 | France . |
| 2257831 | 8/1975 | France . |
| 2308843 | 11/1976 | France . |
| 2309019 | 11/1976 | France . |
| 2331863 | 6/1977 | France . |
| 148789 | 4/1961 | U.S.S.R. . |

*Primary Examiner*—Noah P. Kamen
*Attorney, Agent, or Firm*—Dennison, Meserole, Pollack & Scheiner

[57] ABSTRACT

The invention concerns a thermal transfer layer with high transfer coefficient between two materials which can have different expansion coefficients. The thermal transfer layer comprises expanded graphite inserted between the materials which are selected from among carbonaceous materials, ceramics and metals or metal alloys. The expanded graphite is either inserted in the form of a rolled or compressed sheet, or is compressed in situ. The invention also concerns a device for the cooling of a structure subjected to intense, continuous, intermittent or pulsating heat flux, by means of fluid circulation tubes placed in the passages in the structure. A flexible material which is a good heat conductor in a compressed state, such as expanded graphite, is placed between the structure to be cooled and each tube.

13 Claims, 1 Drawing Sheet

THERMAL TRANSFER LAYER

BACKGROUND OF THE INVENTION

The present invention concerns a thermal transfer layer with high transfer coefficient between two materials which can have different expansion coefficients, and its application to the cooling of a structure subjected to intense heat flux.

The materials of the invention are selected from among carbonaceous material, ceramics and metals or metal alloys. Carbonaceous materials in this sense include essentially industrial carbons graphites, and carbon-carbon composites.

STATE OF THE ART

It is generally known that, particularly if they have different expansion coefficients, such materials can be joined with a good thermal transfer only with some difficulty, and this lack of transfer can be detrimental in numerous applications.

Thus for example, in devices wherein an element of carbonaceous material must be cooled by water circulation, the fragility and porosity of the carbonaceous material generally prevent direct cooling and the element made of carbonaceous materials must be affixed to a metal element. Problems then arise concerning the mechanical fixation and the thermal contact.

Numerous cases are known wherein a structure subjected to intense heat flux is to be cooled, wherein this heat flux can be of external or internal origin in relation to the structure, which can be either a metal structure or a carbonaceous or ceramic material. The heat flux, according to circumstances, can be continuous, intermittent or pulsating.

Chemical reactors, combustion devices, continuous casting of molten metals, both fission and fusion nuclear reactors, targets which are subjected to high radiation fluxes (X-rays, lasers, etc.), or particles, which can be either continuous or pulsating, could be cited particularly. The traditional solution consists of placing assemblies of tubes in which a coolant fluid circulates inside the structure to be cooled.

The problem then is to obtain very good thermal transfer, in the course of the thermal cycles to which the structure is being subjected, between the passages in the structure and the external walls of the metal cooling tubes, despite the irregularities of the contacting surfaces which are often very rough (for instance in fusion thermonuclear reactors) and especially the different expansion coefficients of the tubes and the structure to be cooled.

In order to have an acceptable thermal transfer, clamping pressures higher than 100 kPa must be exerted between the components. Under the best circumstances, transfer coefficients on the order of $9 \times 10^3$ $W.m^{-2}.K^{-1}$ are obtained. Transfer coefficients are very sensitive to the surface conditions of the elements and can be reproduced only with the greatest difficulty, which is obviously quite awkward.

One method to resolve this problem is brazing. This solution, which is very effective with some materials, is costly and requires a temperature below the fusion temperature of the brazing process. Moreover, for the materials having very different expansion coefficients, it is possible in some cases to braze them by insertion of a metal sheet which accommodates the stresses. Then is it necessary to use costly and delicate metals such as molybdenum, zirconium, etc.... Finally, ceramics such as silicon carbide and nitride are extremely difficult to braze, especially if they are calcined to a density near theoretical.

The main purpose of the invention is to provide a thermal transfer which is simpler to utilize, more economical and which can be used at high temperature (above 2000 degrees C if the materials to be joined allow it).

SUMMARY OF THE INVENTION

A first object of the invention is a thermal transfer layer with high transfer coefficient between two materials which can have different expansion coefficients, characterized in that it is constituted of expanded and recompressed graphite, inserted between the materials to be joined.

The materials to be joined thermally are selected from among:
  carbonaceous materials: artificial carbons and graphites such as vitreous carbon, polycrystalline graphites, etc. ..., carbon-carbon composites.
  ceramics such as silicone carbide, silicon nitride, boron carbide, tantalum carbide,
  metals and metal alloys.

According to the invention, the thermal transfer layer, for instance, can be inserted between two different carbonaceous materials, or a carbonaceous material and a metal, or a ceramic and a metal.

A second object of the invention is an arrangement for cooling a structure subjected to intense, continuous, intermittent or pulsating heat flux, by means of tubes for the circulation of fluid, placed in passages in the structure, characterized in that a flexible material which is a good heat conductor in compressed state, and can be charged with a metal or a carbonaceous powder, is inserted between each tube and the structure to be cooled. This flexible material can advantageously be constituted of expanded graphite, which is more or less recompressed or rolled. It can also be constituted of other forms of flexible carbonaceous materials, such as woven materials and felts of carbon or graphite fiber which may be charged with metal powder.

A third object of the invention is a process for cooling a structure subjected to intense, continuous, intermittent or pulsating heat flux, by means of fluid circulation tubes, placed in passages in the structure, characterized in that each tube is surrounded beforehand with a layer of flexible material as defined in the preceding, then each tube is inserted into the passages, and the tubes are subjected to expansion under pressure so as to ensure the compression of the flexible material between the tube and the passages to at least 10 kPa.

A fourth object of the same invention is a process for cooling a structure subjected to intense, continuous or pulsating heat flux, by means of fluid circulation tubes, this structure constituted of a plurality of discrete elements, characterized in that at least one semi-circular passage is formed in each element of the structure, each element is placed on at least one cooling tube, with insertion of a layer of flexible material as defined in the preceding and the elements and the tubes are interlocked, so as to apply to the flexible material a degree of compression equal at least to 10 kPa.

Finally, a last object of the invention is its application to the cooling of the first wall of a fusion thermonuclear reactor, particularly of the "TOKAMAK" type.

DESCRIPTION OF THE PREFERRED EMBODIMENTS

Figure 1:
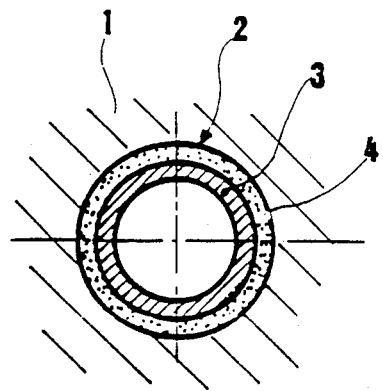
FIGS. 1 through 5 are cross-sectional views illustrating the thermal transfer layer of the invention.

For clear comprehension of the invention, it is to be recalled that expanded graphite is obtained by abrupt heating of foliated graphite, even to as high as 1000 degrees C, thus giving an exfoliated graphite having a density on the order of 0.002. This graphite can then be more or less recompressed in blocks which are of density from 0.02 to 2 or rolled in sheets of 0.1 to 2 mm thickness, of density on the order of 1. The expanded recompressed graphite possesses an excellent heat conductivity in the compression plane and a heat conductivity which is much lower in the perpendicular direction. But it also presents good flexibility and good elasticity. Because of this, it allows for a conductive contact even for great thermal strains or deformations of the materials.

This products, called "PAPYEX", is available from "LE CARBONE LORRAINE" company. It exists in different gradations, differing particularly in their expansion coefficients, the expansion coefficients being between approximately 4 and $6.10^{-6} K^{-1}$. This expanded graphite can also comprise a charge such as a metal powder, which improves its thermal conductivity.

Various tests show that the thermal transfer coefficient between two surfaces of materials which can have different expansion coefficients is always improved when expanded compressed graphite is inserted between said surfaces. This gain depends upon the temperature, the clamping pressure of the materials, their surface condition and their constitution.

The expanded graphite according to the invention can be inserted in compressed state in the form of compressed or rolled sheet.

Graphite can also be inserted in a non-compressed form and subsequently compressed in situ during application of the materials. This last variation is used advantageously when the surfaces of the materials are not flat and/or are very rough. In the following non-limiting examples, the term "expanded graphite" generally designates exfoliated graphite, more or less recompressed or rolled.

EXAMPLE 1

A cylindrical disc of graphite of 50 mm diameter is applied to a metal surface by central support.

The graphite (grade 1346 of "LE CARBONNE-LORRAINE") has an expansion coefficient of 5.5 to $6 \times 10^{-6} . K^{-1}$.

The metal is of stainless steel 316L which has an expansion coefficient of $16 \times 10^{-6} . K^{-1}$.

Comparative tests are carried out to determine the heat transfer coefficient between the graphite and the metal surface using a power application of 75 watts. In some examples, the graphite directly contacts the stainless steel, while in other examples, a thermal transfer layer according to the invention is located therebetween. This thermal transfer layer is a sheet of expanded graphite having a density 1 and thickness 0.2 mm which is placed under various application pressures, as noted.

The results are shown in Table 1 hereinafter.

TABLE 1

| kPa pressure | 10 | 80 | 120 |
| --- | --- | --- | --- |
| A in $W.m^{-2}K^{-1}$ | $1,7 \times 10^3$ | $1,4 \times 10^3$ | $2,2 \times 10^3$ |
| B in $W.m^{-2}K^{-1}$ | $2,7 \times 10^4$ | $3,4 \times 10^4$ | $3,6 \times 10^4$ |

A: Heat transfer coefficient without expanded graphite thermal transfer layer.

B: Heat transfer coefficient with thermal transfer layer according to the invention.

EXAMPLE 2

Example 2 is identical to Example 1, with the sole difference that the expanded graphite is replaced by another graphite (grade 5890 of Le Carbonne Lorraine having an expansion coefficient of $4.5 . 10^{-10} . K^{-1}$. Table 2 in a similar manner shows the results of the tests carried out in the same conditions as those in Example 1.

TABLE 2

| kPa pressure | 10 | 80 | 120 |
| --- | --- | --- | --- |
| A' in $W.m^{-2}.K^{-1}$ | $5 \times 10^3$ | $6 \times 10^3$ | $9 \times 10^3$ |
| B' in $W.m^{-2}.K^{-1}$ | $10^4$ | $2 \times 10^4$ | $3 \times 10^4$ |

A': Heat transfer coefficient without expanded graphite thermal transfer layer
B': Heat transfer coefficient with thermal transfer layer according to the invention.

A': Heat transfer coefficient without expanded graphite thermal transfer layer.

B': Heat transfer coefficient with thermal transfer layer according to the invention.

In these tests, it is established that the heat transfer coefficients with a contact according to the invention are on the order of or are greater than $10^4 W.m^{-2} .K^{-1}$. With other pairings of materials and/or different conditions, they reach values of $6 \times 10^4 W.m^{-2} . K^{-1}$.

FIGS. 1 to 5 illustrate application of the invention to the cooling of a structure subjected to intense, continuous, intermittent or pulsating heat flux. To make the drawings clearer, the thickness of the walls of the metal tubes and layers of flexible material is greatly exaggerated.

In FIG. 1, the structure 1 to be cooled comprises a plurality of passages 2 into which are inserted metal tubes 3, which allow the circulation of a cooling fluid (liquid or gas). The thermal transfer layer between structure 1 (which, for example, may be a block of graphite), and metal tube 3 is ensured by the use of a thin layer 4 of flexible material which is a good conductor, which may be expanded graphite, more or less recompressed or rolled. For the installation, sufficient play is provided between metal tube 3 and passage 2, and the tube is surrounded with a layer 4 of expanded graphite. When the installation has been completed, the metal tube is subjected to an expansion which may be obtained by placing it under hydraulic pressure, which causes the compression of expanded graphite layer 4 and reduces its thickness to a value which can be between 0.1 to 2 mm.

The pressure to which strip 4 is subjected must be equal at least to 10 kPa, so as to ensure a heat transfer coefficient equal at least to $10^4 W·m^{-2} K^{-1}$.

Figure 2:
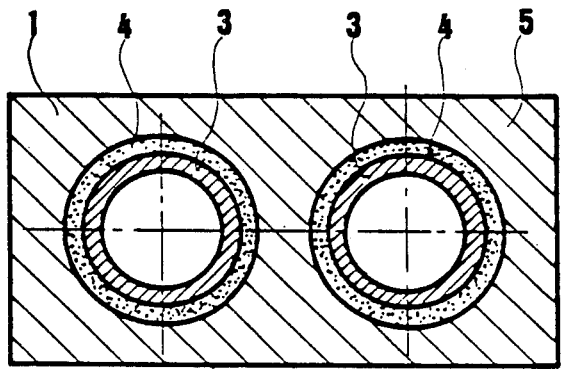

In FIG. 2, a transverse cross section shows an element of structure 5 which is graphite, in parallelepipedic shape, comprising two cooling tubes 3 of which the thermal contact with graphite block 5 is ensured by interposition of a layer of expanded graphite 4, having a thickness reduced by approximately 10% as a result of the expansion of tubes 2 after their installation.

Figure 3:
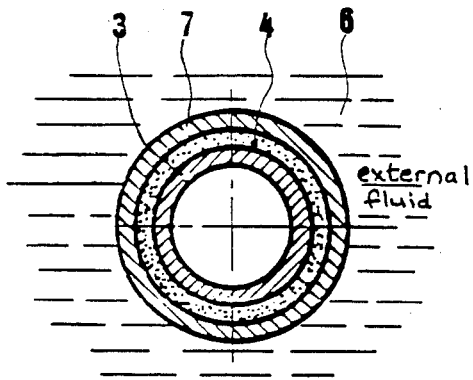

FIG. 3 shows a variation of embodiment wherein the thermal flux is applied by an external fluid 6, which is contained by a first wall 7, which is preferably a metal wall in order to guarantee the seal; the thermal contact between this wall 7 and coolant tube 3 is ensured, as before, by interposition of a sheet 4 of expanded graphite, compressed following its installation by expansion of tube 2, the sheet of expanded graphite thus compressed having a final thickness on the order of 0.2 mm.

Figure 4:
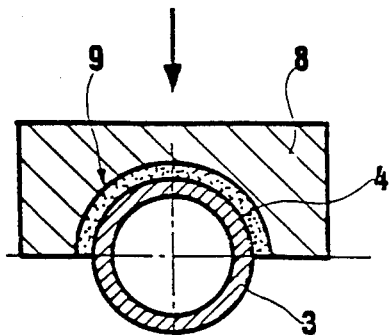
Figure 5:
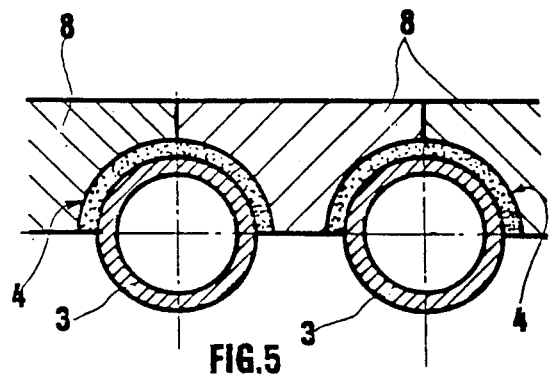

FIGS. 4 and 5 show a variation of application of the invention wherein the structure to be cooled is placed on the nest (bundle) of tubes following interposition of the layer of flexible material.

In the example which is shown, the structure to be cooled is constituted of an assembly by discrete elements such as bricks 8 of carbonaceous material (graphite, or carbon-carbon composite), in which semi-circular passages are preformed or worked in and the semi-circular passage are placed on tubes 3 with interposition of flexible material 4. The compression of flexible material 4 is carried out by the means used for placement and immobilization of bricks 8, means can be of any known type (stirrups, threaded rods, etc...).

Such a structure for instance can constitute the first wall of a fusion thermonuclear reactor for toric shape, which is directly subjected to the heat flux generated by thermonuclear reactions.

The use of expanded compressed graphite to constitute the flexible element 4, because of its anisotropic structure, also presents the advantage of ensuring spreading of the heat flux moving perpendicular to the direction of transmission. In this manner, a local heat peak ("hot point") on the external surface of the structure to be cooled is spread out over an extended peripheral zone of the cooling tube, on account of the high conductivity of the expanded compressed graphite in the direction parallel to the thin sheets of graphite, in other words in the direction perpendicular to the compression and the heat flux.

According to the invention, it is possible to use other forms of flexible carbonaceous materials having comparable thermal properties such as woven materials or felts of carbon or graphite fibers, optionally charged with metal powder in order to improve the thermal conductivity. Considering their fibrous structure, these materials also have a highly anisotropic thermal conductivity.

The invention can be applied to any time intense, continuous, intermittent or pulsed heat fluxes that must be evacuated by fluid circulation cooling means, and particularly in fusion or fission nuclear reactors (protective tiles, limiters and diverters), the continuous casting of metals, and targets subjected to intense fluxes of rays or particles which can be at levels, for example, of one to several hundreds of watts per square centimeter.

What is claimed is:

1. In a structure subjected to an intense continuous, intermittent or pulsating heat flux, a cooling means comprising fluids circulation tubes placed in passages in said structure, each of said tubes being surrounded by a layer of a heat conducting flexible carbonaceous material compressed between said tube and said structure, the heat transfer coefficient between said tube and said structure being at least $10^4 Wm^{-2}K^{-1}$.

2. Structure as in claim 1, wherein said fluid circulation tubes are metallic.

3. Structure as in claim 1 or 2 wherein the flexible material 4 comprises expanded graphite.

4. Structure as in claim 3, wherein the expanded graphite is charged with a metal powder.

5. Structure as in claim 1 or 2 wherein the flexible carbonaceous material 4 is selected from the group consisting of woven materials and felts of carbon fibers and graphite.

6. Structure as in claim 5, wherein said fibrous carbonaceous material is charged with metal powder.

7. Process for fabricating a cooling device for a structure comprising a plurality of passages which is subjected to an intense continuous, intermittent or pulsating heat flux, comprising the steps of:
   (a) surrounding each of a plurality of fluid circulation tubes with a layer of heat conducting, flexible material;
   (b) inserting each said surrounded tube into a passage in said structure; and
   (c) subsequently subjecting each said surrounded tube to an expansion under pressure sufficient to cause each layer of said flexible material to be compressed between said structure and the corresponding tube with a force of at least 10 kPa.

8. Process for fabricating a cooling device for a structure comprising a plurality of discrete elements which is subjected to intense continuous, intermittent or pulsating heat flux, comprising the steps of:
   (a) forming at least one semicircular passage in a surface of each of said elements;
   (b) lining each said passage with a flexible, heat conducting material;
   (c) nesting a cooling tube in each said liquid passage; and
   (d) joining said elements and tubes so as to place said heat conducting material under a compressive force of at least 10 kPa.

9. Process as in claim 7 or 8, wherein the flexible material 4 is expanded graphite.

10. Process as in claim 9, wherein the expanded graphite is charged with a metal powder.

11. Process as in claim 7 or 8, wherein the flexible material 4 comprises a fibrous carbonaceous material selected from the group consisting of woven materials and felts of carbon fibers and graphite.

12. Process as in claim 11, wherein said fibrous carbonaceous material is charged with metal powder.

13. Process as in claim 8 or 8, wherein said structure being cooled is a wall of a thermonuclear fusion reactor.

* * * * *